D. RINALDO.
CLAMP RING FOR HOSE COUPLINGS.
APPLICATION FILED DEC. 20, 1909.

1,078,957.

Patented Nov. 18, 1913.

Witnesses
F. M. Meyer
M. E. Gray

Inventor
D. Rinaldo
By
Attorney

UNITED STATES PATENT OFFICE.

DAVID RINALDO, OF SAN JOSE, CALIFORNIA.

CLAMP-RING FOR HOSE-COUPLINGS.

1,078,957.	Specification of Letters Patent.	Patented Nov. 18, 1913.

Application filed December 20, 1909. Serial No. 534,234.

*To all whom it may concern:*

Be it known that I, DAVID RINALDO, a citizen of the United States, residing at San Jose, in the county of Santa Clara and State of California, have invented certain new and useful Improvements in Clamp-Rings for Hose-Couplings, of which the following is a specification.

This invention relates to improvements in clamps used to fasten flexible tubes or hose to couplings or other fittings.

The object of the invention is to provide simple and effective means for quickly securing the sections of flexible hose to any coupling, mender or other fittings used in connection with flexible tubes, so as to insure strong, air-tight and water-tight connection.

A further object of the invention is to provide the securing of flexible tubes or hose to couplings or other fittings having tapering shanks, by means of the clamp-ring, each to have specially formed threads to bite or pinch the flexible material so as to take a tight and firm grip on the same.

The invention also relates to the specific details of construction and arrangement of parts, which will be hereinafter described and particularly pointed out in the claims.

Figure 1:
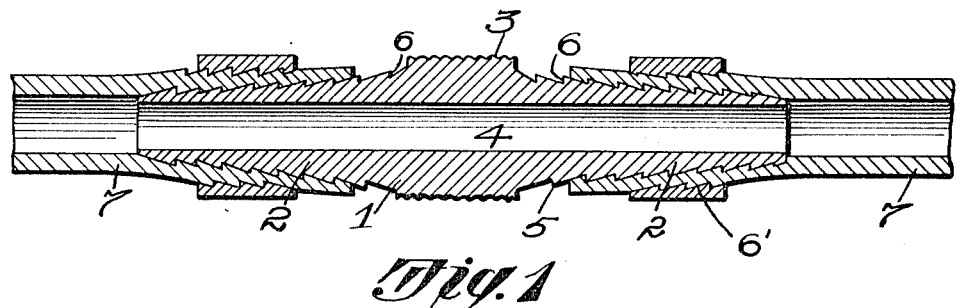
Figure 2:
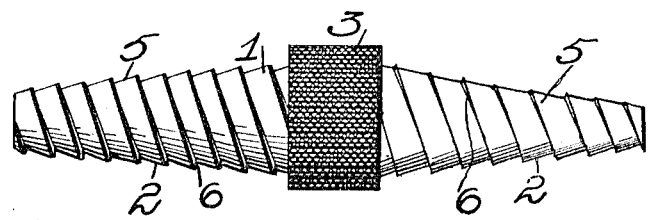
Figure 3:
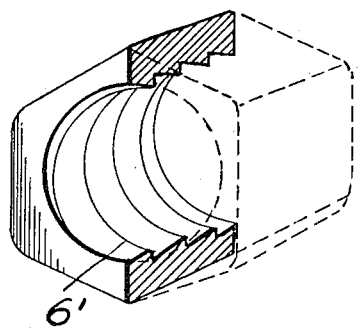

In the drawings:—Figure 1 is a vertical section of my improved clamp-ring, and a tapering shank illustrating the application of the ring. Fig. 2 is a side elevation of the shanks. Fig. 3 is a detail view of my clamp-ring.

The same numerals refer to like parts of all the figures.

1 indicates the male member, which may be a coupling, a mender or a fitting, with tapered shanks 2—2.

3 is an intermediate boss or regular screw coupling.

The taper shanks are formed on their outer circumference with coarse spiral ratchet-shaped threads. 5 the base of the thread, inclines rapidly toward the large end of the shank, and the walls 6 are substantially radial, to take a tight and firm grip on the flexible tube.

The female members —8— are the clamp-rings. Each ring is provided with an opening of uniform diameter throughout its entire length and is formed with a spiral ratchet-shaped thread 6', of substantially the same pitch as the ratchet-shaped thread of the taper shanks.

In operation, the clamp-ring is slipped over the end of the hose 7; then the end of hose 7 is forced on to the taper shank, which operation naturally expands the fibers of the tube, making it gradually thinner toward its end. The clamp-ring is then moved back up on the hose until it binds, when it is screwed up as far as possible toward the end of the hose, over the shank within. By reason of the threads of the shank and of the ring being substantially of uniform diameter, the inner and outer walls of the hose will be forced respectively into the depressions of the shank and ring. The expanded and gradually reduced thickness of the walls of the hose make it possible for substantially the whole length of the thread of the clamp-ring to engage and force the material into both sets of threads, thereby making a secure, water-tight and air-tight connection. Of course, the inner surface of the ring not being tapered, the threads nearest the end of the hose will more firmly grip the hose than those at the other end of the ring.

It will be understood that the coupling shown in the drawing is used for mending a break intermediate the length of a hose, and that coupling devices are to be employed, where required, in lieu of the boss 3, for making couplings for flexible tubes or hose.

What I claim is:

1. In combination with two hose ends, a tubular coupling member having an enlarged central portion and tapering therefrom to both ends, said tapering portions entering said hose ends, and having angular threads, one face of the thread being substantially at right angles to the axis of the coupling, and the other making a very acute angle therewith and inclined outwardly to the center of the coupling and rings around said hose ends wholly detached from said coupling member, each ring being of less taper than the coupling member, and having an internal thread of like pitch with the thread of the coupling member.

2. In combination with a hose end, a tubular coupling member having an enlarged portion and tapering therefrom to the end, said tapering portion entering said hose end, and having angular threads, one face of the thread being substantially at right angles to the axis of the coupling, and the other making a very acute angle therewith and inclined outwardly to said enlarged portion, and a ring around said hose end, wholly detached from said coupling member, of less taper than the coupling member, and having an internal thread of like pitch with the thread of the coupling member.

In testimony whereof I affix my signature in presence of two witnesses.

DAVID RINALDO.

Witnesses:
E. L. RHODES,
W. C. PHILLIPS.